(12) United States Patent
Weiss et al.

(10) Patent No.: US 8,774,965 B2
(45) Date of Patent: Jul. 8, 2014

(54) METHOD AND DEVICE FOR CONTROLLING A MANIPULATOR

(75) Inventors: Martin Weiss, Margertshausen (DE); Christian Sonner, München (DE)

(73) Assignee: KUKA Laboratories GmbH, Augsburg (DE)

( * ) Notice: Subject to any disclaimer, the term of this patent is extended or adjusted under 35 U.S.C. 154(b) by 767 days.

(21) Appl. No.: 12/789,657

(22) Filed: May 28, 2010

(65) Prior Publication Data

US 2010/0305753 A1    Dec. 2, 2010

(51) Int. Cl.
*G06F 19/00*    (2011.01)
*B25J 9/16*    (2006.01)
*G05B 19/4103*    (2006.01)

(52) U.S. Cl.
CPC ..... *B25J 9/1664* (2013.01); *G05B 2219/33272* (2013.01); *G05B 2219/34135* (2013.01); *G05B 2219/34158* (2013.01); *G05B 19/4103* (2013.01)
USPC .......................................................... 700/245

(58) Field of Classification Search
USPC ....................................................... 700/245
See application file for complete search history.

(56) References Cited

U.S. PATENT DOCUMENTS

| | | | | |
|---|---|---|---|---|
| 4,218,172 A * | 8/1980 | Freund | | 414/730 |
| 4,821,207 A * | 4/1989 | Ming et al. | | 700/252 |
| 5,109,340 A * | 4/1992 | Kanayama | | 701/25 |
| 5,655,060 A * | 8/1997 | Lucas | | 700/250 |
| 5,726,896 A | 3/1998 | Jia et al. | | |
| 6,216,058 B1 * | 4/2001 | Hosek et al. | | 700/245 |
| 6,234,232 B1 * | 5/2001 | Kane et al. | | 157/1.24 |
| 6,292,715 B1 * | 9/2001 | Rongo | | 700/249 |
| 6,567,711 B1 * | 5/2003 | Hosek et al. | | 700/55 |
| 6,643,563 B2 * | 11/2003 | Hosek et al. | | 700/245 |
| 7,016,019 B2 * | 3/2006 | Van Den Biggelaar et al. | | 355/72 |
| 7,130,716 B2 * | 10/2006 | Rogers et al. | | 700/218 |
| 7,292,910 B2 * | 11/2007 | Gmeiner | | 700/245 |
| 7,295,891 B2 * | 11/2007 | Huttenhofer et al. | | 700/245 |
| 7,742,838 B2 * | 6/2010 | Weiß | | 700/248 |

(Continued)

FOREIGN PATENT DOCUMENTS

CN    101077578 A    11/2007
DE    19618332 A1    1/1997

(Continued)

OTHER PUBLICATIONS

European Patent Office; Extended Search Report in European Patent Application No. 10005239.8 dated Mar. 27, 2014; 7 pages.

(Continued)

*Primary Examiner* — John R Olszewski
*Assistant Examiner* — Jean-Paul Cass
(74) *Attorney, Agent, or Firm* — Wood, Herron & Evans, LLP

(57) ABSTRACT

According to a method according to the invention for controlling a manipulator, in particular a robot (10), a planned path (z1(t)) of the manipulator is specified by a path generating device (1.1, 1.2, 1.3), a control path (z2(t)) is determined automatically on the basis of the planned path by a path conversion device (2), and the control path is traversed with the manipulator by a manipulator controller (3), with the path conversion device (2) determining curvature information ($a_{ij}$; t2($t_i$)) of the control path on the basis of curvature information ($a_{ij}$; t1($t_i$)) of the planned path.

13 Claims, 1 Drawing Sheet

(56) References Cited

U.S. PATENT DOCUMENTS

Figure 1:
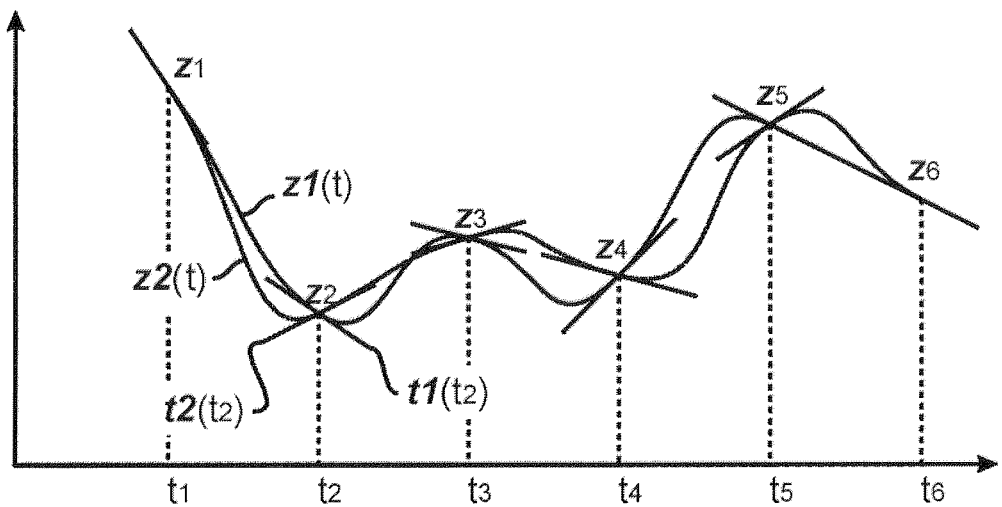

| | | | |
|---|---|---|---|
| 7,764,039 B2* | 7/2010 | Yamaguchi et al. | 318/569 |
| 7,919,940 B2* | 4/2011 | Miller et al. | 318/163 |
| 7,927,062 B2* | 4/2011 | Rice et al. | 414/806 |
| 8,078,321 B2* | 12/2011 | Iba | 700/253 |
| 8,084,706 B2* | 12/2011 | Johnson et al. | 219/121.6 |
| 8,140,177 B2* | 3/2012 | Ide et al. | 700/178 |
| 8,155,930 B2* | 4/2012 | Onishi et al. | 703/2 |
| 8,180,488 B2* | 5/2012 | Kariyazaki et al. | 700/264 |
| 2004/0249509 A1* | 12/2004 | Rogers et al. | 700/245 |
| 2006/0052901 A1* | 3/2006 | Nihei et al. | 700/245 |
| 2007/0030271 A1* | 2/2007 | Kamiya | 345/442 |

FOREIGN PATENT DOCUMENTS

| | | |
|---|---|---|
| DE | 19811049 A1 | 10/1998 |
| DE | 10 2006 022 483 A1 | 11/2007 |
| EP | 0 312 544 B1 | 8/1994 |
| EP | 0706103 A1 | 4/1996 |
| EP | 1 117 020 A2 | 7/2001 |

OTHER PUBLICATIONS

Chinese Patent Office; Office Action in Chinese Patent Application No. 20101088439.3 dated Oct. 30, 2013; 14 pages.

* cited by examiner

METHOD AND DEVICE FOR CONTROLLING A MANIPULATOR

The present invention relates to a method and a device for controlling a manipulator, in particular a robot, wherein a planned path of the manipulator is predetermined by a path generating device, a control path is determined automatically on the basis of the planned path by a path converting device, and the control path is traversed with the manipulator by a manipulator controller.

Movements of manipulators, for example robots, have normally been specified heretofore by a sequence of poses. To that end the individual poses are for example moved to and thereby "taught," or are defined offline in a computer program by coordinates for a reference coordinate system such as the tool center point (TCP) or by the axes of motion. The manipulator then travels to the poses one after another.

To this end, its manipulator controller interpolates a control path between the poses, for example in straight lines or by circle segments. In order to generate smooth control paths, along with a smoothing linear or circular interpolation it is also known to interpolate successive poses by splines, i.e., functions that are defined little by little between control points.

EP 1 117 020 B1 proposes interpolating control points by spline sections only when there is no sharp corner on the control point. From US 2007/0030271 A1 it is known for a robot controller to determine the splines with attention to the length and angle of the tangent vectors at the control points, in order to avoid closed loops. With the same objective, U.S. Pat. No. 7,295,891 B2 proposes parameterizing the position, orientation and additional axes separately from each other. From DE 10 2006 022 483 A1 a display of the path tangent at a control point is known, as well as a directional arrow perpendicular thereto. The control point can be shifted by moving the control point along the path tangent or the directional arrow. EP 0 312 544 B1 teaches a method for more efficient calculation of intermediate values of splines for the individual axes of a robot arm.

For example, if a CAD model of a part to be worked on by a robot is available, the desired Cartesian path can be generated already in functional form instead of discrete poses, in particular as a spline or Bézier curve. Today's manipulator controllers do not permit the use of such planned paths directly as control paths, however. Instead, the planned paths are first broken down into control points and passed to the manipulator controller as target poses, which the controller in turn then interpolates to a control path and traverses. Even if the manipulator controller interpolates the target poses by splines, there is no guarantee that the path originally generated as a spline will be produced again thereby. Because as FIG. 1 shows, in which control points $z_1, \ldots, z_6$ are interpolated by two different splines $z1(t)$, $z2(t)$ which have the same values and first derivatives at the control points, depicted by tangents $t1(t)$, $t2(t)$, there are still degrees of freedom available for the interpolation, depending on the degree of the splines. So if a CAD tool for example generates the planned path $z1(t)$, which is then broken down into control points $z_1, \ldots, z_6$, the manipulator controller can, contrary to the intention, interpolate and traverse them on the basis of the control path $z2(t)$, which deviates from the planned path $z1(t)$.

The object of the present invention is to specify an improved method for controlling a manipulator.

The present invention is based on the idea of additionally taking into account curvature information of the planned path when determining curvature information of the control path. Whereas up to now, as described in the introduction in reference to FIG. 1, when determining the control path $z2(t)$ the planned path $z1(t)$ was broken down into control points $z_1, \ldots, z_6$, which were then interpolated without attention to curvature information, and the course of the control path $z2(t)$ between the control points $z_1, \ldots, z_6$ could sometimes deviate significantly from the planned path $z1(t)$, the present invention makes it possible to traverse previously planned paths more precisely.

To this end, a path for the manipulator is first predefined by a path generating device. A path generating device may comprise for example a CAD (computer aided design) application, a path optimizer and/or an input device, in particular graphic, for specifying control points of the path, tangents to the path or the like.

The term Cartesian path is used in the present case in particular for a parameterized function whose function values specify positions and/or orientations of a reference system of the manipulator, for example the TCP. For example, if the position of the TCP or of some other source of reference coordinates for the manipulator is described by the three coordinates (x, y, z), which describe the distance from a base coordinate system in that base coordinate system, and its orientation is described by the three EULER or KARDAN angles ($\alpha, \beta, \gamma$) of the reference coordinate system relative to the base coordinate system, then the Cartesian path can be parameterized with the path parameter t, which may depict in particular the travel time:

$$z(t)=[x(t),y(t),z(t),\alpha(t),\beta(t),\gamma(t)]^T. \quad (1)$$

This function may be for example a function defined piece by piece, in particular between control points $z_1=z(t_1)$, $z_2=z(t_2), \ldots$, in particular a polynomial function of the degree g, $$z(t) = \sum_{j=0}^{g} a_{ij}(t-t_i)^j \Leftrightarrow t \in [t_i, t_{i+1}] \quad (2)$$

known as a spline. Splines with g=3 are referred to as cubic splines, splines with g>3 correspondingly as higher-degree splines. The planned and/or control path can also be specified or defined as a B spline, as described for example in Carl de Boor, *A Practical Guide to Splines*, Springer Verlag, 1978. These have the advantage that changes in the coefficients have only a local effect, i.e., they do not produce an effect between all contact points.

On the basis of the planned path, a path conversion device automatically determines a control path, which is then traversed by a manipulator controller with the manipulator in a known manner, for example by the manipulator controller scanning the control path and moving to the scanned points while adhering to a predefined velocity or acceleration profile, for example a trapezoidal velocity profile.

While in this process heretofore the planned path was broken down into control points and only those points were interpolated by the control path, according to the invention curvature information of the control path is determined on the basis of curvature information of the planned path.

Curvature information in the meaning of the present invention may comprise in particular first and/or higher derivatives of the planned and/or control path according to a path parameter. If a Cartesian path is given in the form of a parameterized function, first and/or higher derivatives of the control path can be determined according to a path parameter t2

$$\frac{dz2(t2)}{dt2}, \frac{d^2z2(t2)}{dt2^2}, \quad (3)$$

on the basis of the first and/or higher derivatives of the planned path according to a path parameter t1, $$\frac{dz1(t1)}{dt1}, \frac{d^2z1(t1)}{dt1^2}, \quad (4)$$

where t1 and t2 may be identical.

Curvature information in the meaning of the present information may likewise comprise tangent devices and/or tangent changes of the path. If $$t(t_i) = \frac{dz(t)}{dt}\bigg|_{t=t_i} \quad (5)$$

describes a tangent vector at control point $z_i = z(t_i)$, and $$\frac{dt(t)}{dt}, \frac{d^2t(t)}{dt^2}, \quad (6)$$

or the normal and binormal vector describes its changes, then tangent devices and/or changes of the control path can be determined on the basis of the tangent devices and/or changes of the planned path.

Tangent devices and/or changes of a path can be defined advantageously in a local coordinate system of a control point $z_i$ of the path.

Curvature information in the meaning of the present invention may likewise comprise polynomial coefficients, in particular polynomial coefficients of the first or a higher order. Utilization of (2) in (3) through (6) shows that in particular derivatives and tangents (tangent changes) may also be described equivalently by polynomials, for example the polynomial coefficients $a_{ij}$ of a spline.

A path can likewise be specified or determined as a Bézier curve. The curvature information can then comprise its so-called reference points.

In a preferred embodiment, the path conversion device determines curvature information of the control path on the basis of curvature information of the planned path electively or optionally, it being possible to choose preferably section by section, in particular between control points, between a determination that considers curvature information of the planned path and a determination exclusively on the basis of the control points, for example a linear or circular interpolation or an interpolation with arbitrary splines. In this way it is possible to force exact traversing of the planned path where this is necessary, especially for individual sections, while in the other sections conventional fast tools may be used to generate the control path.

Preferably there is provision that the control path is approximated while specifying a maximum deviation from the planned path. For example, a number of control points of the control path may be changed, in particular reduced, compared to the number of control points of the planned path. Since a control path with fewer control points normally cannot reproduce the planned path exactly when the same interpolation method is used, a deviation up to a predefined maximum deviation may be allowed to reduce the number of support points.

In a preferred embodiment, at least one control point is added between two existing control points to an already planned path or to a control path, without changing the control path significantly. If B splines are used, for example, such changes have only a local effect. Such control points added after the fact to an already planned path or control path may be for example switching points, for example to activate or deactivate a tool. Because attention is paid to the curvature information, so that a deviation between the planned path and control path is prevented, the insertion of additional control points after the fact does not result in a deviation between the planned path and the control path.

Figure 2:
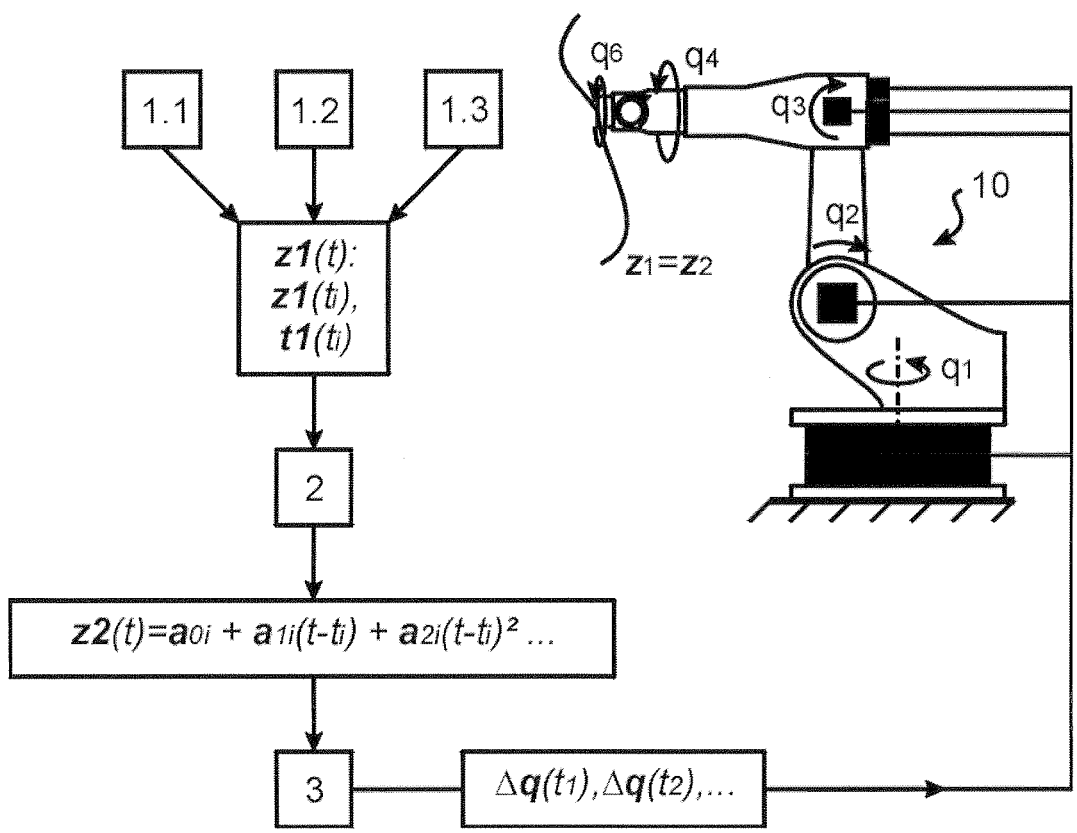

Additional advantages and features result from the subordinate claims and the exemplary embodiments. To this end the drawing shows the following, partially in schematic form:

FIG. 1: sections of a planned path and a control path according to the existing art, and FIG. 2: a device for controlling a robot according to an embodiment of the present invention.

FIG. 1 shows sections of a planned path z1(t), as specified for example by a CAD tool. According to the existing art, a path conversion device breaks down the planned path z1(t), predefined for example as a cubic spline according to (2), into control points $z_1, \ldots, z_6$. These are interpolated by a manipulator controller into a control path in the form of a likewise cubic spline z2(t), which, while it has the same control points $z_1, \ldots, z_6$, differs in form from the planned path z1(t), i.e. in the routing between the control points, as can be seen in FIG. 1, since curvature information, in particular the tangents t1($t_i$) of the planned path z1(t), were not considered in the control points $z_1, \ldots, z_6$. Disadvantageously, such a controller according to the existing art thus does not traverse the planned path z1(t), but the control path z2(t), which deviates from it clearly.

FIG. 2 shows a device carrying out a method for controlling a robot 10 according to an embodiment of the present invention.

A path generating device in the form of a CAD tool 1.1, a path optimizer 1.2 or a graphic input device 1.3 that permits the specification of points and tangents in a graphic manner defines a planned path z1(t) for the TCP of robot 10, for example by specifying control points z1($t_i$) and tangents t1($t_i$) at those points, as indicated in FIG. 2. In variants that are not depicted, the path generating device can also define the planned path by specifying the polynomial coefficients of a spline or the reference points of a Bézier curve.

A path conversion device 2 determines a control path z2(t) automatically on the basis of this planned path z1(t). To that end it not only determines its control points z2($t_i$), but also curvature information, for example the polynomial coefficients $a_{ij}$ of a spline, as indicated in FIG. 2, or in variants that are not shown, tangents t2($t_i$) at the control points z2($t_i$) or reference points of a Bézier curve. This curvature information is ascertained from the curvature information of the planned path, for example the tangents t1($t_i$) at its control points z1($t_i$), which the path generating device exports together with the control points z1($t_i$). The equivalent depictions by means of control points and tangents at those points, as a spline or as a Bézier curve can at the same time be converted to each other.

In a variant not depicted, path conversion device 2 reduces the number of control points z2($t_i$) of the control path, in order to reduce the computing effort. Since such a control path normally can no longer portray the planned path exactly, a maximum spacing is specified in path conversion device 2 and the control path is determined so that its distance from the planned path does not exceed this maximum spacing. This can also be executed when the depictions of planned and control path within each other are possible only with greater computing effort, or not at all.

In another variant not depicted, before the control path is determined an additional point is inserted between two control points $z1(t_i)$, $z1(t_{i+1})$ of the planned path, for example a switching point for activating a tool of robot 10. In addition or alternatively, an additional point between two control points $z2(t_i)$, $z2(t_{i+1})$ may also be added to the already determined control path. Since curvature information is also considered when determining the control path on the basis of the planned path, so that a deviation between the planned path and the control path is limited is prevented, the insertion of one or more additional points advantageously does not result in a change to the control path.

In another variant not shown, the control path is determined with attention to the curvature information only by sections, for example between the control points $z1(t_2)$ and $z1(t_5)$ of the planned path, but in sections $[t_1, t_2]$ and $[t_5, t_6]$ on the other hand by means of linear interpolation.

A manipulator controller 3 traverses the control path with the TCP of robot 10, by determining target increments $\Delta q$ of the six joint coordinates $q_1$ through $q_6$ from the control path $z2(t)$ and activating or regulating the drives of robot 10 accordingly. It should be pointed out in this connection that the planned path and the control path are Cartesian paths that describe the position and orientation of the TCP of robot 10 in space.

The planned path or the control path can also be specified or edited for example in the form of a computer program. This can be done for example in the form $LIN(x1, y1, z1, \alpha1, \beta1, \gamma1)$ $SPLINE(x2, y2, z2, \alpha2, \beta2, \gamma2)$, $TANGENT1(x, y, z)$, $TANGENT2(\Delta x, \Delta y, \Delta z)$

⋮ according to which the control point $z(t_1)$ is moved to in a straight line, and from there a spline is laid through control point $z(t_2)$, which has a tangent there that is defined by a line segment point $(x, y, z)$ and a directional vector $(\Delta x, \Delta y, \Delta z)$.

| Reference labels | |
| --- | --- |
| 1.1 | CAD tool |
| 1.2 | path optimizer |
| 1.3 | graphic input device |
| 2 | path conversion device |
| 3 | manipulator controller |
| 10 | robot |
| z(t) | path |
| z1(t) | planned path |
| z2(t) | control path |
| $z(t_i)$ | control point |
| $t(t_i)$ | tangent vector |

The invention claimed is:

1. A method for controlling a robotic manipulator, comprising:
    obtaining a planned path for the robotic manipulator with a path generating device;
    converting the planned path into a control path for the robotic manipulator with a path conversion device, wherein the control path includes curvature information that is determined on the basis of curvature information of the planned path; and
    controlling the robotic manipulator to traverse the control path with a controller,
    wherein the planned path further comprises a plurality of sections, and wherein converting the planned path into the control path comprises determining the curvature information of the control path on the basis of the curvature information of only fewer than all of the plurality of sections of the planned path; and
    wherein there is a deviation of the curvature information between the planned path and the control path, and wherein the planned path and the control path arrive at the same destination.

2. The method of claim 1, wherein the curvature information of the planned path comprises first-order or higher-order derivatives of the planned path with respect to a path parameter.

3. The method of claim 1, wherein the curvature information of the planned path comprises either tangents of the planned path or first- order or higher-order derivatives of the tangents with respect to a path parameter.

4. The method of claim 3, wherein the tangents or tangent derivatives are defined in a local coordinate system of a control point of the control path.

5. The method of claim 1, wherein the curvature information of the planned path comprises first-order or higher-order polynomial coefficients.

6. The method of claim 1, wherein at least one of the planned path or the control path comprises one or more splines, and wherein the splines are either of third or higher degree or are B splines.

7. The method of claim 1, wherein the planned path comprises one or more Bezier curves, and wherein the curvature information of the planned path comprises the reference points of at least one of the Bezier curves.

8. The method of claim 1, wherein the planned path and the control path each comprise a plurality of control points, and wherein the control path has fewer control points than the planned path.

9. The method of claim 8, wherein converting the planned path to the control path utilizes a specified maximum deviation between the planned path and the control path.

10. The method of claim 1, wherein at least one of the planned path and the control path comprises a Cartesian path of a reference system associated with a tool-center point of the robotic manipulator.

11. The method of claim 1, wherein at least one control point is added to the planned path or to the control path based at least in part on the curvature information of the planned path and the control path such that the deviation between the planned path and the control path is limited.

12. A system for controlling a robotic manipulator, comprising:
    a path generating device specifying a planned path for the robotic manipulator;
    a path conversion device automatically determining a control path on the basis of the planned path, the conversion device determining curvature information of the control path on the basis of curvature information of the planned path; and
    a controller controlling the robotic manipulator to traverse the control path, wherein the planned path further comprises a plurality of sections, and wherein converting the planned path into the control path comprises determining the curvature information of the control path on the basis of the curvature information of only fewer than all of the plurality of sections of the planned path; and wherein there is a deviation of the curvature information between the planned path and the control path, and wherein the planned path and the control path arrive at the same destination.

13. A program product, comprising:

a computer-readable medium; and program code stored on the computer readable medium and configured to control a robotic manipulator;

the program code configured to obtain a planned path for the robotic manipulator;

the program code further configured to convert the planned path into a control path for the robotic manipulator, wherein curvature information of the control path that is determined on the basis of curvature information of the planned path; and the program code further configured to control the robotic manipulator to traverse the control path;

wherein the planned path further comprises a plurality of sections, and wherein converting the planned path into the control path comprises determining the curvature information of the control path on the basis of the curvature information of only fewer than all of the plurality of sections of the planned path; and wherein there is a deviation of the curvature information between the planned path and the control path, and wherein the planned path and the control path arrive at the same destination.

* * * * *

UNITED STATES PATENT AND TRADEMARK OFFICE
CERTIFICATE OF CORRECTION

PATENT NO. : 8,774,965 B2  
APPLICATION NO. : 12/789657  
DATED : July 8, 2014  
INVENTOR(S) : Martin Weiss et al.

Page 1 of 1

It is certified that error appears in the above-identified patent and that said Letters Patent is hereby corrected as shown below:

On the Title Page:

Column 1,
Coversheet does not list "Foreign Application Priority Data" and should read -- Foreign Application Priority Data May 29, 2009 (DE)....... 10 2009 023 307.5. --.

In the Specification:

Column 5,
Lines 14-15 read "so that a deviation between the planned path and the control path is limited is prevented" and should read -- so that a deviation between the planned path and the control path is limited --.

In the Claims:

Claim 13, Column 8,
Lines 1-3 reads "wherein curvature information of the control path that is determined on the basis of curvature information of the planned path" and should read -- wherein curvature information of the control path is determined on the basis of curvature information of the planned path --.

Signed and Sealed this  
Ninth Day of December, 2014

Michelle K. Lee  
*Deputy Director of the United States Patent and Trademark Office*